United States Patent [19]

Slagel

[11] 4,153,777
[45] May 8, 1979

[54] POLYURETHANE AND METHOD OF MAKING

[75] Inventor: Edwin C. Slagel, Phoenix, Ariz.

[73] Assignee: Goodyear Aerospace Corporation, Akron, Ohio

[21] Appl. No.: 618,653

[22] Filed: Oct. 1, 1975

[51] Int. Cl.² .............................................. C08G 18/12
[52] U.S. Cl. ......................................... 528/60; 528/65
[58] Field of Search .................. 260/77.5 AT, 75 NT, 260/77.5 AP, 75 NP, 77.5 AN; 528/60, 65

[56] References Cited

U.S. PATENT DOCUMENTS

| | | | |
|---|---|---|---|
| 3,124,605 | 3/1964 | Wagner | 260/75 NT |
| 3,201,372 | 8/1965 | Wagner | 260/75 NT |
| 3,591,561 | 7/1971 | Kazama et al. | 260/77.5 AN |
| 3,663,514 | 5/1972 | Campbell et al. | 260/77.5 AT |
| 3,711,364 | 1/1973 | Ahramjian | 260/77.5 AT |
| 3,823,060 | 7/1974 | McClung et al. | 260/77.5 AT |
| 3,952,040 | 4/1976 | Schnurbusch et al. | 260/75 NT |

Primary Examiner—Maurice J. Welsh
Attorney, Agent, or Firm—J. D. Wolfe; J. G. Pere

[57] ABSTRACT

A polyurethane, being the reaction product of a polyester or polyether polyol with 1.5 to 2.5 equivalents of polyisocyanate, 0.05 to 0.40 equivalents of water cured with a polyol having less than 800 molecular weight.

2 Claims, No Drawings

POLYURETHANE AND METHOD OF MAKING

This invention relates to polyurethanes having improved physical properties. More particularly, this invention relates to a method of making nonporous polyurethanes utilizing water to obtain products having optical clarity and good resistance to weathering, ultraviolet and thermal exposure.

It has been discovered that if part of the organic polyisocyanate used to produce a prepolymer is first reacted with water, followed by a polyol, the resultant prepolymer can be extended and/or crosslinked with a polyol to give a cured polyurethane with the previous noted properties.

The polyurethanes in accordance with this invention can be made by reacting an equivalent of a reactive hydrogen containing material of 400 to 6000 molecular weight with 1.5 to 2.5 equivalents of an organic polyisocyanate in the presence of 0.05 to 0.40 equivalents of water to give a prepolymer, then reacting the resulting degassed prepolymer with 0.90 to 1.00 equivalents of a polyol of less than 800 molecular weight to cure the prepolymer to obtain a polyurethane having improved properties, particularly in regard to resistance to weathering, thermal and ultraviolet exposure with good optical clarity.

Although any of the reactive hydrogen materials of 400 to 6500 molecular weight can be used, for example, the polyether polyols or polyester polyols, including those of the lactones such as epsilon-caprolactone with glycols of 2 to 10 carbon atoms. Likewise, any of the organic polyisocyanates can be used, but the preferred ones are the ones useful for making nondiscoloring polyurethanes.

Glycols which can be used to prepare the compositions of this invention include polyoxyalkylene ether glycols and polyester glycols. These glycols have number average molecular weights of about 700 to 1,000. Glycols having molecular weights of about 750 to 900 are especially effective in producing high quality polyurethanes.

Illustrative of suitable polyoxyalkylene ether glycols are poly-1,2-propylene ether glycol, poly-1,3-propylene ether glycol and polytetramethylene ether glycol. Polyoxyalkylene ether glycols useful in this invention can be prepared by condensing epoxides or other cyclic ethers as is well known in the art.

Representative polyesters useful in this invention include polycaprolactones and polyesters based on esterification of dicarboxylic acids of four to 10 carbon atoms, such as adipic, succinic and sebacic acids, and low molecular weight glycols of two to eight carbon atoms such as ethylene glycol, propylene glycol, diethylene glycol, 1,4-butanediol and 1,6-hexanediol. The polycaprolacetones are prepared by condensing caprolactone in the presence of difunctional active hydrogen compounds such as water or the above enumerated low molecular weight glycols. Polyesters obtained by esterification of dicarboxylic acids and glycols can be derived by well-known esterification or transesterification procedures. The preferred materials for this invention are the polycaprolactones of the glycols of two to 10 carbon atoms.

The isocyanates used in the preparation of the compositions of this invention are diisocyanatodicyclohexylmethanes and preferably mixtures thereof containing from about 10–100 percent of the trans-transisomer of 4,4'-methylenebis(cyclohexyl isocyanate), also hereinafter referred to as "PICM." Other compounds usually present in the mixtures of position and/or stereoisomers of the diisocyanato-dicyclohexylmethane used in this invention are the cis-trans and cis-cis isomers of PICM and stereoisomers of 2,4-methylenebis-(cyclohexyl isocyanate). These, as well as the trans-trans PICM isomer, are present in amounts which can be controlled by the procedures used to prepare the diisocyanato-dicyclohexylmethane. Preferred diisocyanates are isomeric PICM mixtures which are liquid at 25° C. or less. Such liquid PICM's contain less than about 26 percent trans-trans-isomer and less than about 72 percent cis-cis-isomer. An especially preferred mixture contains the trans-trans, cis-trans and cis-cis-isomers of PICM in a weight ratio of about 20:65:15 and optionally small amounts up to about 5 percent by weight of 2,4'-methylenebis(cyclohexyl isocyanate). These preferred mixtures can be conveniently handled and give high-quality polyurethanes.

The PICM used in this invention is prepared by phosgenating the corresponding 4,4'-methylenebis (cyclohexyl amine) (PACM) by procedures well known in the art, of U.S. Pat. Nos. 2,644,007, 2,680,127 and 2,908,703. The PACM isomer mixtures which upon phosgenation yield PICM that is a liquid at room temperature are also well known in the art, and can be obtained by hydrogenation of methylenedianiline under mild conditions and/or by fractional crystallization of PACM isomer mixtures in the presence of water and alcohols such as methanol and ethanol.

The following examples are representative and illustrative and all parts and percentages are by weight unless otherwise indicated.

EXAMPLE I

Two equivalents of a cycloaliphatic polyisocyanate, identified hereinbefore as PICM was charged to a reaction vessel equipped with an agitator and dry $N_2$ inlet. The PICM was heated to 120° C. at which time 0.00001 percent of dibutyltin diacetate was added. The heat source was removed from the reaction vessel and the speed of the agitator was increased so as to form a vortex. At this time 0.2 equivalent of water was slowly added to the PICM, exotherm was sufficient to maintain 120° C. reaction temperature. After completion of the PICM/water reaction, 0.80 equivalent of a 1400 molecular caprolacetone diethylene glycol initiated polyester was added, temperature of the polyester prior to addition was 95° C. The exotherm of the reacting mass was adequate so as to complete the reaction. When the reaction mass reached 105° C., two percent Cyasorb UV 5411 and 0.2 percent Irganox 1010 were added. The prepolymer was allowed to cool to 72° C., degassed and sealed. Both Cyasorb 5411 and Tinuvin 328 gave excellent results from 0.5 percent to 2.0 percent by weight.

To this prepolymer (250 parts by weight) was added 14.5 parts by weight of an 85/15 equivalent weight blend of 1,4-butanediol,trimethylolpropane (identified hereinbefore as TMP) respectively, and 0.01 percent of a 50/50 blend of dibutyltin diacetate/TP-440. Cure was completed by compression molding at 30 tons (0.070"×12"×12" sample) at 135° C. for 40 minutes. Die "C" dumbbell samples were cut from the test sheet and allowed to age 1, 7, 14 and 30 days prior to testing, test results are an average of five specimens. Results of the tests are shown in Table 1.

Table 1

| Aging, days | 1 | 7 | 14 | 30 |
|---|---|---|---|---|
| Tensile, psi | 9585 | 7700 | 7452 | 7504 |
| Elongation % | 600 | 500 | 485 | 500 |
| Shore A hardness | 73 | 78 | 77 | — |
| Set | 67 | 75 | 75 | — |

Additional test sheets were prepared using various blends of 1,4-butanediol/trimethylolpropane ranging from 95 to 60 equivalents of 1,4-butanediol to 5 to 40 equivalents of TMP respectively. Testing of these sheets showed the physical properties to be in the same range as the test samples of Table 1.

Additional test sheets using 93/7, 90/10, 95/15, 80/20, 75/25, 70/30, 75/35 and 60/40 1,4-butanediol/TMP respectively were compression molded for exposure to ultra violet radiation (accelerated and natural) and thermal radiation.

After 12 months accelerated ultraviolet radiation exposure little or no change was noted in the test samples. After 16 months outdoor exposure little or no change was noted in the test samples. Results of the ultraviolet radiation exposure are given in Table 2.

Table 2

| Curative 1,4 BD/TMP | Initial Color (Gardner) | Color 3 Mos. | Color 6 Mos. | Color 9 Mos. | Color 12 Mos. | Color 16 Mos. | Remarks |
|---|---|---|---|---|---|---|---|
| 90/10 | 1 | 1 | 1 | 1 | 1+ | 1+ | Accelerated |
| 85/15 | 1 | 1 | 1 | 1 | 1+ | 1+ | " |
| 75/25 | 1 | 1 | 1 | 1 | 1+ | 1+ | " |
| 70/30 | 1 | 1 | 1 | 1 | 1+ | 1+ | " |
| 85/15 | 1 | 1 | 1 | 1 | 1 | 1 | Natural |
| 70/30 | 1 | 1 | 1 | 1 | 1 | 1 | " |

No surface deterioration was apparent on any of the samples. This was unusual as all water white optical grade elastomeric urethanes previously evaluated showed severe surface deterioration after 6 to 9 months outdoor exposure, 45° South in Arizona. Thermal exposure consisted of three days at 315° F. using tensile, psi and Shore A as the test media. Table 3 gives the results of the heat aging tests.

| Curative 1,4 BD/TMP | Original Tensile psi after 14 days R.T. aging | 3 day 315° F. soak Tensile psi | 3 day 315° F. soak Percent loss | Shore A at 75° F. | Shore A at 315° F. (after 8 hrs.) | Color original (Gardner) | Color after 5 days 315° F. |
|---|---|---|---|---|---|---|---|
| 85/15 | 7452 | 4586 | 38 | 77 | 35 | 1 | 7 |
| 75/25 | 7510 | 5712 | 24 | 78 | 55 | 1 | 7 |
| 70/30 | 7730 | 6106 | 21 | 78 | 62 | 1 | 7 |
| 60/40 | 7340 | 5701 | 22 | 78 | 65 | 1 | 7 |

In the above tables, 1,4 BD is the abbreviation for 1,4-butanediol; TP-440 is the tradename of a commercial polypropylene ether trimethylolpropane of about 425 molecular weight; Cyasorb UV 5411 is the tradename for ultraviolet absorbers that reduce the tendency of the tin catalyst to discolor the urethane; Irganox 1010 is the tradename of a multifunctional hindered phenol; Tinuvin 328 is a tradename for a family of ultraviolet absorbers of substituted hydroxyphenyl benzotriazoles.

Instead of the polyester of Example I, it should be appreciated that the polypropylene ether trimethylpropanes of 700 to 1500 molecular weight could be used in the recipe of Example I to give improved polyurethanes in accordance with the spirit of this invention. Also, as heretofore indicated, the aliphatic and alicyclic diisocyanates can be used in Example I to give polyurethanes having good ultraviolet resistance.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane comprising the reaction product of an equivalent of a reactive hydrogen containing material of 400 to 6000 molecular weight selected from polyester polyol or polyether polyol with a degassed reaction product of 1.5 to 2.5 equivalents of an organic polyisocyanate and 0.05 to 0.40 equivalents of water cured with about 0.90 to 1.00 equivalents of a polyol having less than 800 molecular weight.

2. The polyurethane of claim 1 wherein the organic polyisocyanate is diisocyanato dicyclo hexylmethane and the reactive hydrogen containing material is a polycaprolactone obtained by condensing caprolactone with a glycol containing 2 to 10 carbon atoms.

* * * * *